(12) United States Patent
Togami et al.

(10) Patent No.: US 7,805,084 B2
(45) Date of Patent: *Sep. 28, 2010

(54) DUAL STAGE MODULAR OPTICAL DEVICES

(75) Inventors: Chris K. Togami, San Jose, CA (US); Gary Sasser, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 11/134,532

(22) Filed: May 20, 2005

(65) Prior Publication Data

US 2005/0271391 A1    Dec. 8, 2005

Related U.S. Application Data

(60) Provisional application No. 60/572,961, filed on May 20, 2004.

(51) Int. Cl.
*H04B 10/00* (2006.01)
(52) U.S. Cl. ............... 398/164; 398/135; 398/138; 398/140; 385/92; 385/93; 385/89
(58) Field of Classification Search ......... 398/135–139, 398/164, 208; 385/14, 53, 88–94; 439/76, 439/76.1, 607
See application file for complete search history.

(56) References Cited

U.S. PATENT DOCUMENTS

| | | | |
|---|---|---|---|
| 3,987,676 A | 10/1976 | Bennewitz | |
| 4,128,697 A | 12/1978 | Simpson | |
| 4,375,578 A | 3/1983 | Mitchell et al. | |
| 4,690,492 A | 9/1987 | Beard | |
| 4,769,684 A | 9/1988 | Crocker et al. | |
| 4,911,519 A * | 3/1990 | Burton et al. | 385/14 |
| 4,918,702 A | 4/1990 | Kimura | |

(Continued)

FOREIGN PATENT DOCUMENTS

CN    200580013276.2    6/2009

(Continued)

OTHER PUBLICATIONS qLogic: "SANblade: 2-Gbps Fiber Channel to PCI Express Host Bus Adapter", Sep. 2003.*

(Continued)

*Primary Examiner*—Li Liu
(74) *Attorney, Agent, or Firm*—Workman Nydegger

(57) ABSTRACT

Embodiments of the present invention are directed to a dual stage modular optical device for sending and/or receiving optical signals. A first fabricated package includes a light source for generating optical signals and/or a light detector for detecting received optical signals. A second fabricated package includes an opening for accepting circuitry that is to electrically interoperate with the light source and/or light detector to transfer optical signals. A lead frame mechanically connects the first fabricated package to the second fabricated package and electrically connects the light source and/or light detector to contacts exposed in the opening. The dual stage modular optical device can be coupled to a substrate configured to be received within a standard slot of a host system, such as a PCI or PCMCIA slot. Thus, one or more optical connections are integrated within the host device or system.

17 Claims, 5 Drawing Sheets

U.S. PATENT DOCUMENTS

| | | | |
|---|---|---|---|
| 5,047,835 A * | 9/1991 | Chang | 257/433 |
| 5,113,466 A * | 5/1992 | Acarlar et al. | 385/88 |
| 5,212,345 A | 5/1993 | Gutierrez | |
| 5,337,398 A | 8/1994 | Benzoni et al. | |
| 5,347,604 A * | 9/1994 | Go et al. | 385/92 |
| 5,353,364 A | 10/1994 | Kurashima | |
| 5,400,072 A | 3/1995 | Izumi | |
| 5,506,445 A * | 4/1996 | Rosenberg | 257/666 |
| 5,522,002 A * | 5/1996 | Chun et al. | 385/88 |
| 5,545,846 A | 8/1996 | Williams et al. | |
| 5,673,083 A | 9/1997 | Izumi | |
| 5,767,999 A * | 6/1998 | Kayner | 398/164 |
| 5,852,517 A * | 12/1998 | Gerber et al. | 359/811 |
| 6,213,651 B1 | 4/2001 | Jiang et al. | |
| 6,234,686 B1 * | 5/2001 | Tonai et al. | 385/88 |
| 6,239,427 B1 * | 5/2001 | Mizue | 250/239 |
| 6,302,596 B1 * | 10/2001 | Cohen et al. | 385/93 |
| 6,461,058 B1 | 10/2002 | Birch et al. | |
| 6,480,651 B1 | 11/2002 | Rabinski | |
| 6,632,030 B2 | 10/2003 | Jiang | |
| 6,793,406 B1 | 9/2004 | Edwards et al. | |
| 6,821,027 B2 | 11/2004 | Lee et al. | |
| 6,824,315 B2 | 11/2004 | Irie | |
| 6,913,400 B2 | 7/2005 | O'Toole et al. | |
| 7,056,034 B2 | 6/2006 | Togami et al. | |
| 7,156,562 B2 * | 1/2007 | Mazotti et al. | 385/92 |
| 7,264,408 B2 | 9/2007 | Togami | |
| 7,284,916 B2 | 10/2007 | Sasser et al. | |
| 7,334,948 B2 | 2/2008 | Sasser | |
| 2001/0024551 A1 | 9/2001 | Yonemura et al. | |
| 2001/0030789 A1 * | 10/2001 | Jiang et al. | 359/152 |
| 2002/0006041 A1 | 1/2002 | Naoe et al. | |
| 2002/0110328 A1 | 8/2002 | Bischel et al. | |
| 2002/0110335 A1 | 8/2002 | Wagner et al. | |
| 2002/0141708 A1 * | 10/2002 | Shin et al. | 385/92 |
| 2002/0197025 A1 | 12/2002 | Vaganov et al. | |
| 2003/0038297 A1 | 2/2003 | Carroll et al. | |
| 2003/0091301 A1 | 5/2003 | Lee et al. | |
| 2003/0103740 A1 | 6/2003 | Edwards et al. | |
| 2003/0133668 A1 | 7/2003 | Wagner et al. | |
| 2003/0138219 A1 | 7/2003 | O'Toole et al. | |
| 2003/0180012 A1 | 9/2003 | Deane et al. | |
| 2004/0028348 A1 | 2/2004 | Cote et al. | |
| 2004/0114588 A1 | 6/2004 | Golwalkar | |
| 2004/0146250 A1 | 7/2004 | Wakabayashi et al. | |
| 2005/0105915 A1 | 5/2005 | Light | |
| 2006/0013542 A1 | 1/2006 | Schunk | |

FOREIGN PATENT DOCUMENTS

| | | |
|---|---|---|
| CN | 200580013276.2 | 3/2010 |
| CN | 200580013276.2 | 7/2010 |
| EP | 0318970 | 6/1989 |
| EP | 05756355.3 | 6/2009 |
| JP | 55-138891 | 10/1980 |
| JP | 63-128510 | 6/1988 |
| JP | 10-126002 | 5/1998 |
| JP | 10126002 | 5/1998 |
| JP | 2000162473 | 6/2000 |
| JP | 2000249883 | 9/2000 |
| JP | 2001116958 | 4/2001 |
| JP | 20010145611 | 5/2001 |
| JP | 2002-151817 | 5/2002 |
| JP | 02151817 | 5/2002 |
| JP | 2003030581 | 1/2003 |
| JP | 03038605 | 2/2003 |
| JP | 2003043317 | 2/2003 |
| JP | 2003520353 | 7/2003 |
| JP | 2004166807 | 6/2004 |
| JP | 2005-88061 | 4/2005 |
| JP | 05088061 | 4/2005 |
| JP | 2007-509745 | 12/2008 |
| JP | 2007-509745 | 9/2009 |
| KR | 10-2006-7022517 | 11/2007 |
| WO | WO 2005/014408 | 9/2006 |

OTHER PUBLICATIONS

Tammanuki et al: "Multi Form Pluggable 8-Channel Tx/Rx Module for OC-3/OC-12", LEOS 2003, Oct. 27-28, 2003, vol. 2, pp. 569-570.*

Abe et al: "Short Wave SFF Small Form Factor Transceivers", 2001 Electronic Components and Technology Conference, May 29-Jun. 1, 2001, pp. 30-34.* qLogic: "SANblade: 2-Gbps Fiber Channel to PCI Express Host Bus Adapter", Sep. 2003, pp. 1-2.*

U.S. Appl. No. 11/134,530, filed May 20, 2005, Togami.
U.S. Appl. No. 11/135,835, filed May 23, 2005, Sasser.
U.S. Appl. No. 11/134,530, filed May 2, 2006, Office Action.
U.S. Appl. No. 11/134,530, filed Nov. 16, 2006, Office Action.
U.S. Appl. No. 11/134,530, filed May 2, 2007, Office Action.
U.S. Appl. No. 11,134,530, filed Nov. 1, 2007, Office Action.
U.S. Appl. No. 11/116,693, filed Sep. 11, 2006, Office Action.
U.S. Appl. No. 11/116,693, filed Apr. 30, 2007, Notice of Allowance.
U.S. Appl. No. 11/135,835, filed Oct. 11, 2006, Office Action.
U.S. Appl. No. 11/135,835, filed Apr. 20, 2007, Office Action.
U.S. Appl. No. 11/135,835, filed Sep. 28, 2007, Notice of Allowance.
U.S. Appl. No. 11/134,530, filed Apr. 29, 2008, Office Action.
U.S. Appl. No. 11/134,530, filed Jan. 23, 2009, Final Office Action.
U.S. Appl. No. 11/134,530, filed Aug. 5, 2009, Office Action.
U.S. Appl. No. 11/134,530, filed Mar. 4, 2010, Office Action.

* cited by examiner

DUAL STAGE MODULAR OPTICAL DEVICES

CROSS-REFERENCE TO RELATED APPLICATIONS

The present invention claims priority to U.S. Provisional Patent Application Ser. No. 60/572,961, entitled "Dual Stage Modular Optical Devices", filed on May 20, 2004, the entire contents of which are incorporated herein by reference.

BACKGROUND OF THE INVENTION

1. The Field of the Invention

The present invention is generally related to optical devices used in fiber optic communications systems. More particularly, the present invention provides for dual stage modular optical devices.

2. The Relevant Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. Generally, such optical transceivers implement both data signal transmission and reception capabilities. For example, a transmitter portion of a transceiver is configured to convert an incoming electrical data signal into an optical data signal and a receiver portion of the transceiver is configured to convert an incoming optical data signal into an electrical data signal.

More particularly, an optical transceiver at the transmission node receives an electrical data signal from a network device, such as a computer, and converts the electrical data signal to a modulated optical data signal using an optical transmitter such as a laser. The optical data signal can then be transmitted in a fiber optic cable via the optical communications network to a reception node of the network. At the reception node, the optical data signal is received at another optical transceiver that uses a photodetector, such as a photodiode, to convert the received optical data signal back into an electrical data signal. The electrical data signal is then forwarded to a host device, such as a computer, for processing.

Generally, multiple components are designed to accomplish different aspects of these functions. For example, an optical transceiver can include one or more optical subassemblies ("OSA") such as a transmit optical subassembly ("TOSA"), and a receive optical subassembly ("ROSA"). Typically, each OSA is created as a separate physical entity, such as a hermetically sealed cylinder that includes one or more optical sending or receiving components, as well as electrical circuitry for handling and converting between optical and electrical signals. Within the optical transceiver, each OSA generally includes electrical connections to various additional components such as a transceiver substrate, sometimes embodied in the form of a printed circuit board ("PCB"). OSAs in a conventional transceiver are generally oriented such that a longitudinal axis defined by the OSA is substantially parallel to the transceiver substrate. The transceiver substrate, in turn, is mounted to the board of a host bus adapter ("HBA") or other component.

The transceiver substrate can include multiple other active circuitry components particularly designed to drive or handle electrical signals sent to or returning from one or more of the OSAs. Accordingly, such a transceiver substrate will usually include a number of electrical transmission lines with the one or more OSAs. Such connections may include "send" and "receive" data transmission lines for each OSA, one or more power transmission lines for each OSA, and one or more diagnostic data transmission lines for each OSA. These transmission lines are connected between the transceiver substrate and the OSA using different types of electrical connectors, examples of which include an electrical flex circuit, a direct mounting connection between conductive metallic pins extending from the OSA and solder points on the PCB, and a plug connection that extends from the PCB and mounts into electrical extensions from an OSA.

As part of ongoing efforts to uniformly reduce the size of optical transceivers and other components, manufacturing standards such as the small form factor ("SFF"), small form factor pluggable ("SFP"), and 10 gigabit small form factor pluggable ("XFP") standards have been developed. Nonetheless, the size of most optical transceivers, even those that comply with such manufacturing standards, best suits them for external connections to a computer system, such as a desktop computer, a laptop computer, or a handheld digital device.

For example, an SFF or SFP optical transceiver can be used to provide an interface between an optical cable and a standard network cable, such as an Ethernet cable for example, that plugs into a computer system. Alternatively, a number of optical transceivers can be mounted in a network panel and configured to include an external connection to a computer system. However, the number of components within a conventional transceiver, as well as the orientation and the size of SFF or SFP optical transceivers, makes it difficult, if not impossible, to integrate conventional optical transceivers into smaller spaces, such as within a pluggable card for use in a laptop computer or hand held device. For example, despite their relatively compact nature, conventional SFF, SFP, and XFP optical transceiver bodies are still too wide and/or tall to fit within a typical PCMCIA laptop envelope.

A related problem concerns the connections of the optical transceiver. In particular, use of the optical transceiver as an external, rather than internal, component necessitates the use of additional connectors and connections, which increase both the overall cost associated with the system as well as the complexity of the system. As well, optical transceivers employed in an external, rather than integrated, configuration are more prone to rough handling and damage than an integrated component.

Furthermore, even if the conventional optical transceiver could fit within such an envelope, the length of the conventional optical transceiver SFF, SFP, or XFP optical transceiver is such that the transceiver substrate takes up an inordinate amount of board space on a corresponding host bus adapter ("HBA") or other component to which the optical transceiver is attached. This problem is of particular concern in light of the concurrent demands for increases in functionality and decreases in component size. These, and other, considerations make conventional optical transceivers less than ideal for integration within many computer systems. Accordingly, what would be advantageous are reduced cost optical transceivers that can fit within relatively small envelopes such that the optical transceiver can be integrated within compact components and various computing systems and devices.

BRIEF SUMMARY OF THE INVENTION

The foregoing problems with the prior state of the art are overcome by the principles of the present invention, which are directed to dual stage modular optical devices. A first fabricated package includes a light source for generating optical signals and/or a light detector for detecting received optical signals. A second fabricated package includes an opening for accepting circuitry that is to electrically interoperate with the light source and/or light detector to transfer optical signals. A lead frame mechanically connects the first fabricated package to the second fabricated package and electrically connects the light source and/or light detector to contacts exposed in the opening.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
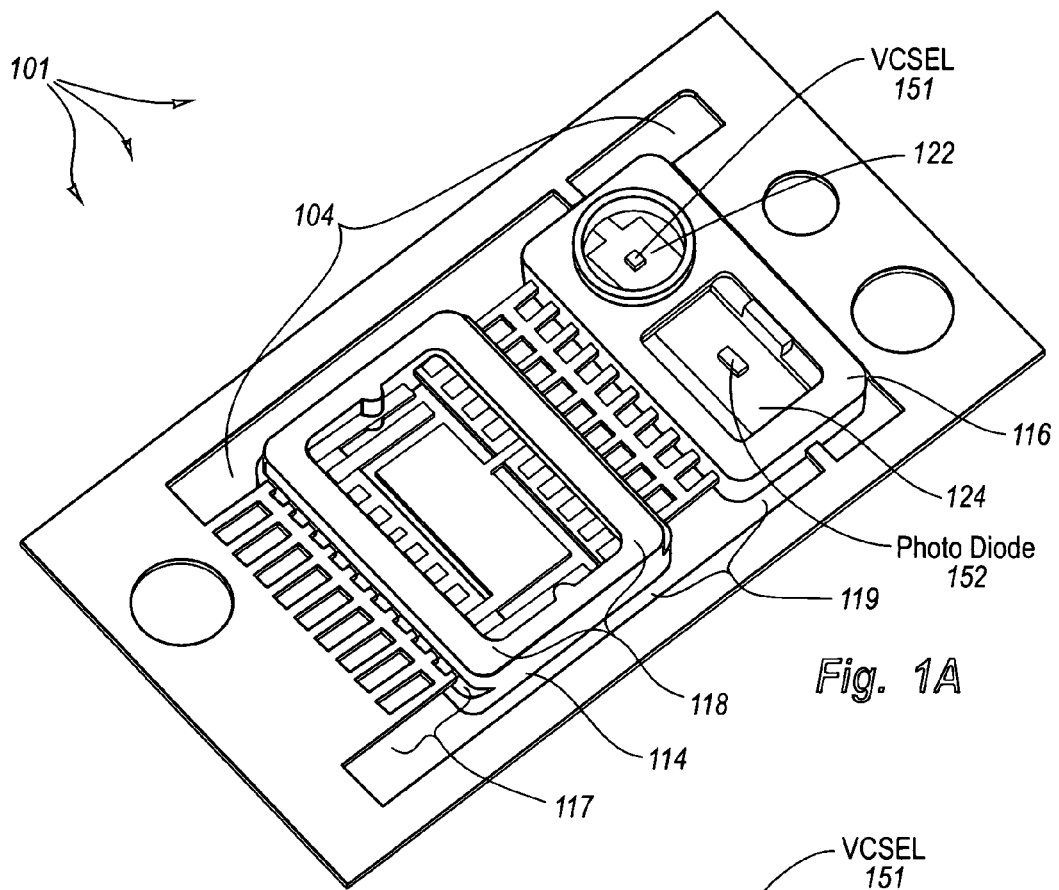
FIG. 1A illustrates an example lead frame including components of an example dual stage fabricated package.

The principles of the present invention relate to dual stage modular optical devices. A first fabricated package includes a light source for generating optical signals and/or a light detector for detecting received optical signals. A second fabricated package includes an opening for accepting circuitry that is to electrically interoperate with the light source and/or light detector to transfer optical signals. A lead frame mechanically connects the first fabricated package to the second fabricated package and electrically connects the light source and/or light detector to contacts exposed in the opening.

In general, embodiments of the present invention describe modular optical devices (e.g., TOSAs and ROSAs) that can be integrated within the relatively small physical envelopes defined by compact components, such as a Host Bus Adapter ("HBA"). Embodiments of the present invention can interoperate with a desktop computer, a laptop computer, or other similar computer system, while maintaining compliance with applicable operational and performance standards.

As used herein, "OSA" refers to any one of a transmit optical subassembly ("TOSA") or a receive optical subassembly ("ROSA"). Further, a "substrate" refers to a printed circuit board ("PCB") having electrically conductive elements such as circuit traces for transmitting power and/or communication signals between components of a modular optical device and another system or device, such as a computer system. A transceiver PCB (e.g., a Host Bus Adapter) can include circuits, devices and systems for facilitating the operation and control of the modular optical device. Such circuits, devices and systems include, but are not limited to, a laser driver, a post amplifier, and transimpedance amplifier.

Embodiments of the present invention include a dual stage fabricated lead frame package (hereinafter referred to as a "dual stage fabricated package"). The dual stage fabricated package includes a first fabricated package and a second fabricated package. In some embodiments, one or more common lead frames mechanically couple the first fabricated package to the second fabricated package and electrically couple components included in the first fabricated package to contacts exposed at the second fabricated package.

The first fabricated package can include a light source (e.g., a laser such as a vertical cavity surface emitting laser ("VCSEL")) and/or light detector (e.g., photodiode) as well as corresponding openings for transmitting and receiving optical signals. The second fabricated package includes contacts for electrically connecting to other components having active and/or passive circuitry components for driving the light source (e.g., a laser driver), converting a received light signal (e.g., transimpedance amplifier), or for implementing other optical signal processing. These other components can include, for example, PCBs, ceramic substrates, packaged ICs, bare ICs, and passive SMT components.

The second fabricated package can also include an external connection, such as, for example a lead frame in a through hole pin or formed configuration, for connecting (e.g., surface mounting) the dual stage fabricated package to a Printed Circuit Board Assembly ("PCBA") or a Host Bus Adapter ("HBA"). When active and/or passive circuitry is included in a PCB insert, there is a reduced (and potentially no) need to duplicate such circuitry on the PCBA. Accordingly, the size of an HBA can be reduced.

Embodiments of the dual stage fabricated package can be mechanically coupled to a lens block that includes receptacles for accepting one or more lens pins. For example, a lens block can be configured to accept a transmission lens pin, a reception lens pin, or a combination of transmission lens pins and/or reception lens pins. Accepted lens pins can be mechanically coupled to the lens block. Lens pins mechanically coupled to the lens block can provide appropriate receptacles for receiving external optical connections. Lens pins can include lenses that focus optical signals.

Accordingly, a lens included in a (transmission) lens pin can direct a generated optical signal from the dual stage fabricated package to an external component (e.g., an optical cable). On the other hand, a lens included in a (reception) lens pin can direct a received optical signal from an external component to the dual stage fabricated package. For example, an optical signal generated at a laser included in the first portion of the dual stage fabricated package can be transferred through the lens block, transferred through a lens in a corresponding transmission lens pin, to a corresponding optical cable. Likewise, an optical signal received from an optical cable can be transferred through a lens in a corresponding reception lens pin, transferred through the lens block, into a corresponding photodiode in the first portion of the dual stage fabricated package.

A dual stage fabricated package, a lens block, and one or more lens pins can be passively or actively aligned to optimize optical signal strength. Dual stage fabricated packages, lens blocks, and lens pins can be fabricated (e.g., molded, machined, cast, etc.) from plastic, metal, or any other suitable material that will allow for alignment of such components relative to one another. A dual stage fabricated package, a lens block, and one or more lens pins can be mechanically coupled using a variety of coupling means, such as, for example, adhesive, metal clips, staples, laser welding, barbed pin, etc. Laser welding can be particularly advantageous when components (e.g., a lens block and a portion of a dual stage fabricated package) are made of similar plastic compounds. Accordingly, a modular optical device, such as, for example, an OSA, can include a dual stage fabricated package, a lens block, and one or more lens pins.

FIG. 1A illustrates an example lead frame 101 including components of an example dual stage fabricated package 104. As depicted, dual stage fabricated package 104 includes fabricated package 116 and fabricated package 114. Fabricated package 116 and fabricated package 114 are mechanically and electrically connected by lead frame portion 119.

Fabricated package 116 further includes transmission opening 122 for transmitting generated optical signals. For example, VCSEL 151 (Vertical Cavity Surface Emitting Laser) can transmit optical signals out of transmission opening 122. Fabricated package 116 also includes detector opening 124 for detecting received optical signals. For example, photodiode 152 can detect optical signals received at detector opening 124. Components included in fabricated package 116 can be wire bonded to contacts of lead frame 101 that extend into transmission opening 122 and detector opening 124, for example, to contacts of portion 119. Accordingly, a light source and photo detector in fabricated package 116 can be electrically coupled to circuitry in or connected to fabricated package 114. Further, lead frame 101 can be manufactured for direct connection to a PCBA without having to perform further (potentially manual) processing on lead frame 101.

Fabricated package 114 includes insert opening portion 118 that can receive a PCB insert or Integrated Circuits ("ICs") that include active and/or passive circuitry. A PCB insert or IC can be wired bonded to contacts of lead frame 101, for example, to the metal contacts within insert opening portion 118. PCB inserts can be secured to fabricated package 114 with adhesive, such as, for example, epoxy. ICs can be protected by potting, by attaching a cover over insert opening 118, or by incorporating a cover into a lens holding clip. A PCB insert or IC can include active and/or passive circuitry components for driving a light source (e.g., a laser driver), converting a received light signal (e.g., transimpedance amplifier), or for implementing other optical signal processing. For example, circuitry of a PCB insert or IC can interoperate with components (e.g., a laser or photo diode) in fabricated package 116 (via lead frame portion 119) to send and/or receive optical signals.

Fabricated package 114 can also be mechanically connected to a portion of lead frame 101, for example, lead frame portion 117, that provides mechanical and/or electrical connections to external components. External connections can be, for example, thru hole, gull-wing, hot bar style, etc. It may be that portion 117 is connected (both electrically and mechanically) to a Printed Circuit Board Assembly ("PCBA") or a Host Bus Adapter ("HBA"). For example, portion 117 can be used to surface mount fabricated package 114 to a PCBA. Accordingly, components included in fabricated package 116 can be electrically connected to components in fabricated package 114 (through portion 119) and further connected to components external to dual stage fabricated package 104 (through portion 117).

In some embodiments, a corrosive resistant coating is used to protect components, such as, for example, VCSEL 151 and photodiode 152, in fabricated packages 114 and 116. For example, a diluted silicone mixture can be used to coat the components of fabricated packages 114 and 116.

Figure 1B:
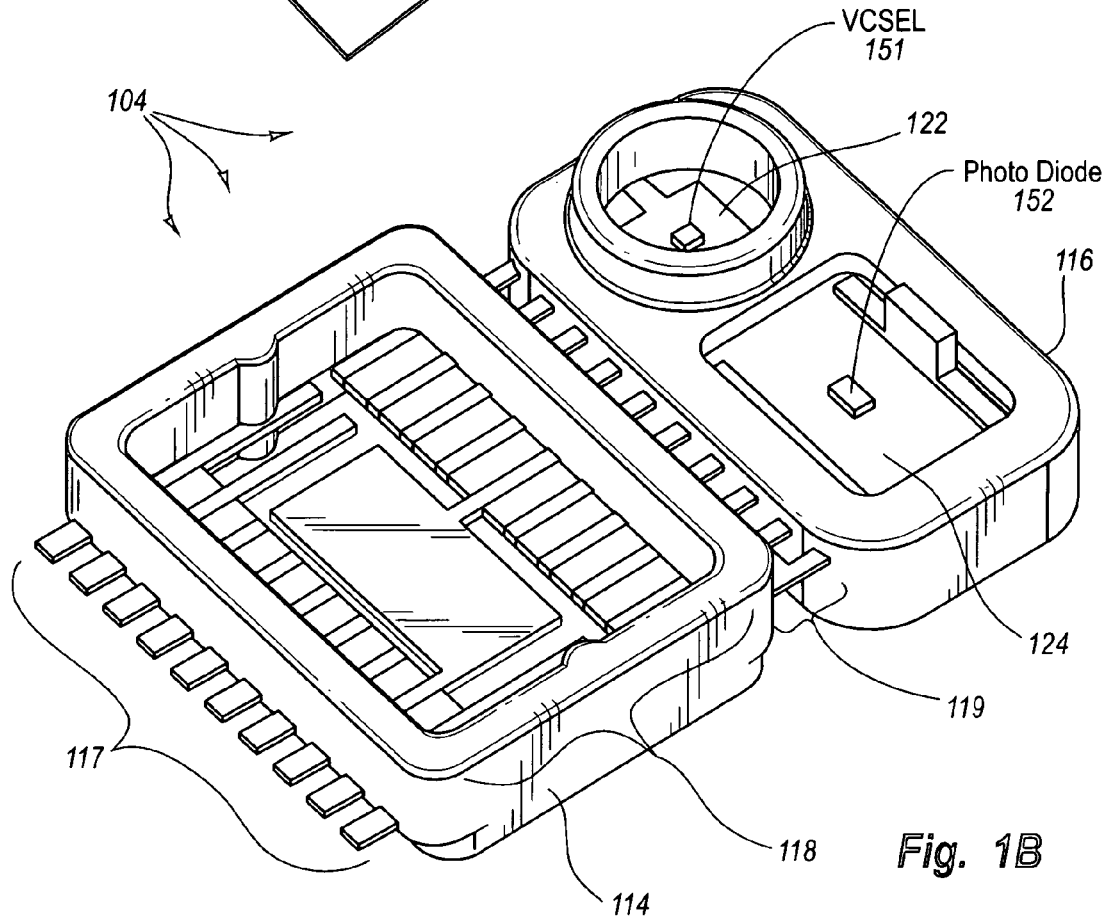
FIG. 1B illustrates components of the example dual stage fabricated package in a fully open configuration.

FIG. 1B illustrates components of the example dual stage fabricated package 104 in a fully open configuration. The fully open configuration in FIG. 1B may result from cutting dual stage fabricated package 104 from lead frame 101. For example, tooling of a (computerized or otherwise automated) component assembly system can be programmed to cut dual stage fabricated package 104 from lead frame 101.

Figure 1C:
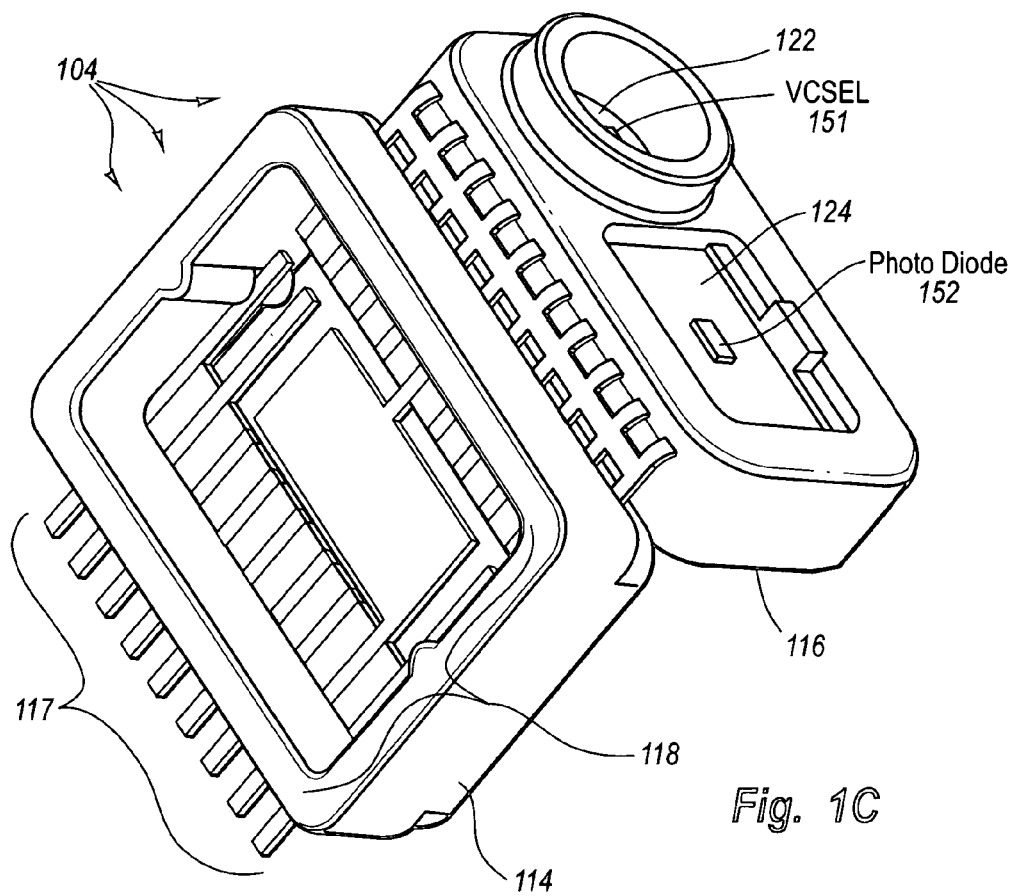
FIG. 1C illustrates components of the example dual stage fabricated package in a partially formed configuration.

FIG. 1C illustrates components of the example dual stage fabricated package 104 in a partially formed configuration. The partially formed configuration in FIG. 1C may result from partially bending portion 119. For example, tooling of a (computerized or otherwise automated) component assembly system can be programmed to partially bend portion 119 resulting in the partially formed configuration of FIG. 1C.

Figure 1D:
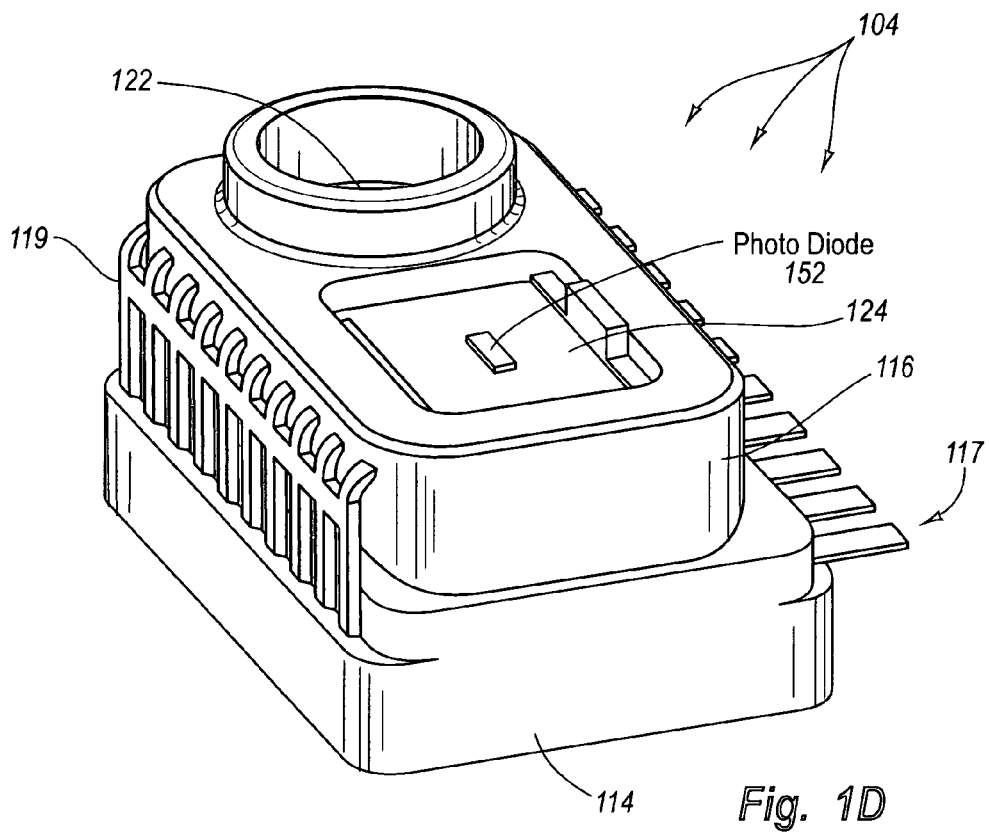
FIG. 1D illustrates components of the example dual stage fabricated package in a fully formed configuration.

FIG. 1D illustrates components of the example dual stage fabricated package 104 in a fully formed configuration. The fully formed configuration in FIG. 1D may result from further bending of portion 119. For example, tooling of a (computerized or otherwise automated) component assembly system can be programmed to further bend portion 119 resulting in the fully formed configuration of FIG. 1D.

Fabricated packages 114 and 116 can be fabricated at the same time thereby reducing the costs of manufacturing dual stage fabricated package 104. Once assembled, dual stage fabricated package 104 can provide the basis for a low cost, reduced form factor OSA. For example, dual stage fabricated package 104 can be mechanically coupled to other components to facilitate OSA functionality, for example, as part of an optical transceiver.

Figure 2A:
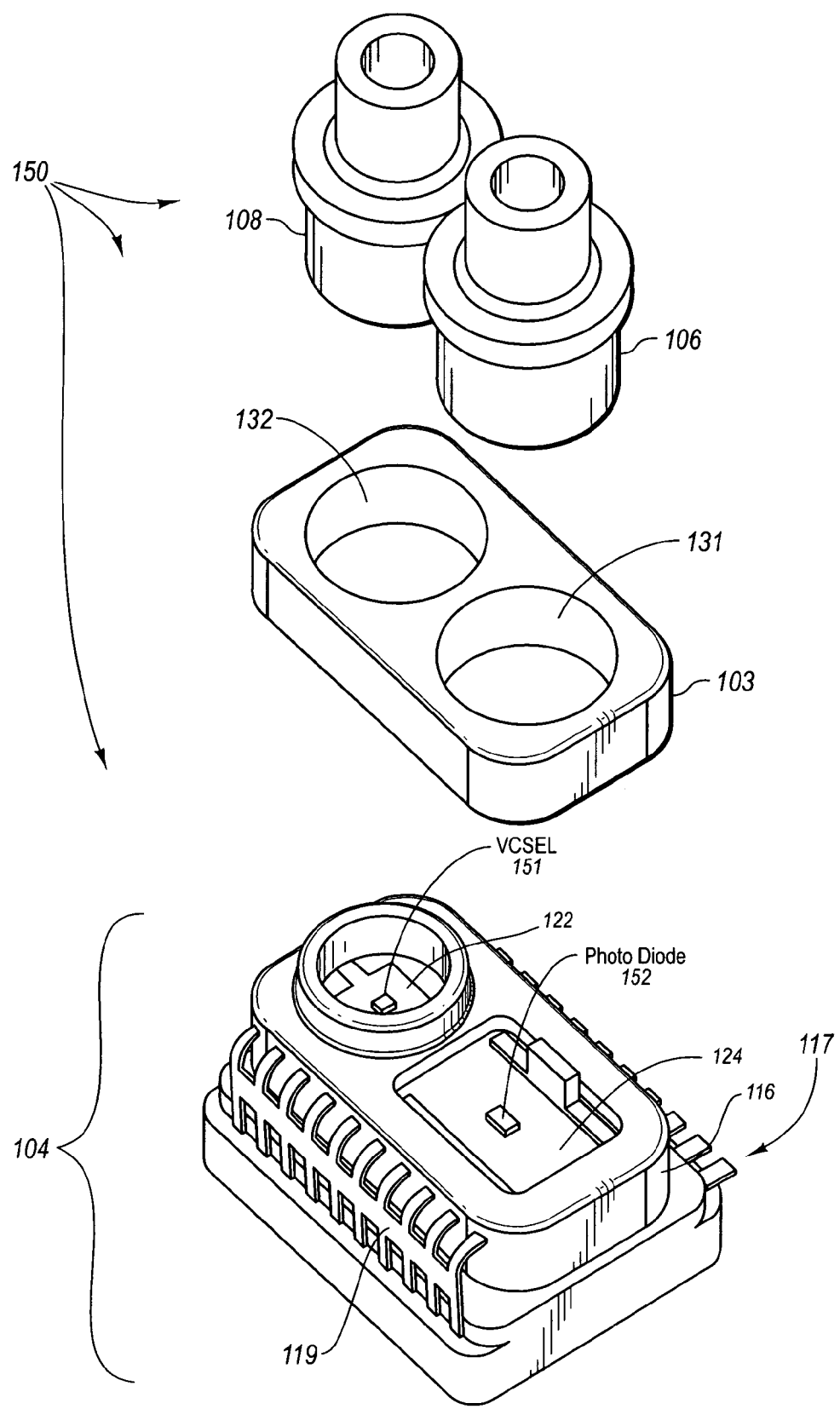
FIG. 2A illustrates an example of components of a modular optical device package including a fully formed dual stage fabricated package.

FIG. 2A illustrates an example of components of a modular optical device package 150 including a fully formed dual stage fabricated package 104. Generally, components similar to those in FIG. 2A can be used in modular optical devices of various form factors, including, but not limited to, an SFF, SFP, and XFP optical transceiver. The foregoing are exemplary however, and modular optical devices can be implemented in various other forms as well. Further, embodiments of the invention are suitable for use in connection with a variety of data rates such as about 1 Gbps, about 2 Gbps, about 4 Gbps, and about 10 Gbps, or higher.

FIG. 2A depicts lens pins 106 and 108, lens block 103, and dual stage fabricated package 104. Lens block 103 can be a fabricated plastic part with locations for one or more lens elements. As depicted, lens block 103 is configured as a TX/RX lens block. That is, lens block 103 includes receptacle 132 for mechanically coupling to a transmission lens pin and receptacle 131 for mechanically coupling to a reception lens pin. Accordingly, lens block 103 facilitates both transmitting and receiving optical signals.

However, lens block 103 or a similar lens block can be configured differently than depicted in FIG. 2A. In some embodiments, lens block 103 or a similar lens block is configured as a separate lens block with reduced functionality. For example, lens block 103 or a similar lens block can be configured as a separate TX lens block for transmitting an optical signal or can be configured as a separate RX lens block for receiving an optical signal. In these embodiments, lens block 103 or a similar lens block can mechanically couple to a lens pin that facilitates the desired functionality (e.g., either transmitting an optical signal or receiving an optical signal).

In other embodiments, lens block 103 or a similar lens block is configured as a combination lens block with different combinations of functionality. For example, lens block 103 or a similar lens block can be configured to transmit a plurality of optical signals and/or receive a plurality of optical signals. Accordingly, lens block 103 or a similar lens block can include a plurality of receptacles for mechanically coupling to transmission lens pins and a corresponding plurality of receptacles for mechanically coupling to reception lens pins. Further, lens block 103 or a similar lens block can be configured as an unbalanced combination lens block. That is, the number of receptacles for mechanically coupling to transmission lens pins and the number of receptacles for mechanically coupling to reception lens pins can differ.

A lens block may or may not include lens elements. For example, in some embodiments, lens elements are included in one or more of receptacles 131 and 132 and/or in one or more other appropriate receptacles based on lens block configuration. In other embodiments, no receptacles include lens elements.

In some embodiments, lens elements are included at various different locations within a lens pin. For example, lens elements can potentially be included at one or more lens element locations in lens pins 106 and 108.

Figure 2B:
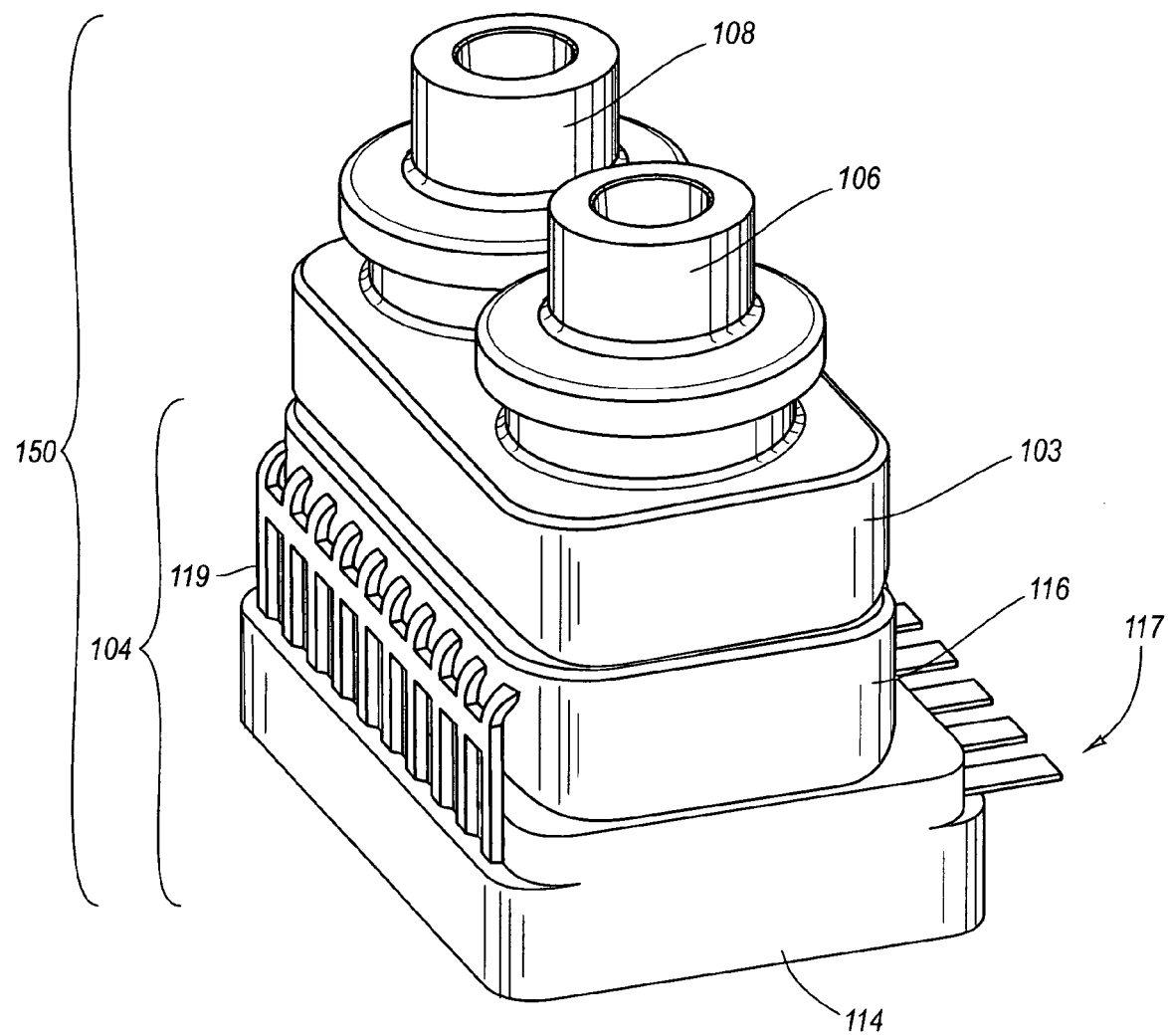
FIG. 2B illustrates an example of an assembled modular optical device package including a fully formed dual stage fabricated package.

FIG. 2B illustrates an example of an assembled modular optical device package 150 including dual stage fabricated package 104. As depicted, lens pins 106 and 108 are mechanically coupled to lens block 103. Lens block 103 is in turn mechanically coupled to dual stage fabricated package 104.

Lens block 103 can include corresponding receptacles (filled with lens pins 108 and 106) for accepting lens pins. Each of the lens pins 108 and 106 can include a corresponding lens that facilitates the transfer (transmission or reception) of optical signals. For example, lens pin 108 can be positioned and aligned over transmission opening 122 (covered by lens block 103) such that generated optical signals are transmitted out the end of lens pin 108. Similarly, lens pin 106 can be positioned and aligned over reception open 124 (covered by lens block 103) such that received optical signals are directed at a corresponding photo detector.

As previously described, components of a modular optical device can be passively or actively aligned. Passive alignment can include assembling components that were manufactured within specified tolerances such that assembling the components causes the components to be aligned. For example, passive alignment can include obtaining a lens block including a transmitting lens pin and a receiving lens pin, each of the lens pins being configured to receive a fiber optic cable that is capable of carrying optical signals. Passive alignment can also include obtaining a dual stage fabricated package that includes a light emitting component and a light detecting component. Passive alignment can also include passively aligning the light emitting component with a lens in the transmitting receptacle by attaching the lens block to the dual stage fabricated package such that a specified optical power from the light emitting component through the transmitting receptacle can be achieved.

Active alignment can include adjusting the position of components that are lightly held together such that optical signal strength is optimized and then more permanently fixing the position of the components. For example, active alignment can include aligning a lens pin, a lens block, and a dual stage fabricated package in a first direction, a second direction, and a third direction such that the signal strength of optical signals transferred between a lens included in the lens pin and the fabricated package is optimized. Active alignment can also include mechanically coupling the lens pin to the lens block to fix the position of the lens relative to the fabricated package in the first direction. Active alignment can also include subsequent to mechanically coupling the lens pin to the lens block, re-aligning the lens block and the dual stage fabricated package in the second and third directions such that the signal strength of optical signals transferred between the lens and the dual stage fabricated package is again optimized. Active alignment can also include mechanically coupling the lens block to the dual stage fabricated package to fix the position of the lens block relative to the dual stage fabricated package in the second and third directions.

In some embodiments, optimizing signal strength includes aligning components such that the output signal strength is maximized. In other embodiments, optimizing signal strength includes aligning components such that the output signal strength closely approximates a pre-selected signal strength (e.g., that is some amount less than the maximum possible output signal strength). Optimizing signal strength to a pre-selected level can include determining the alignment that maximizes signal strength and then "backing off" from the maximum by a fixed amount in a controlled manner.

Modular optical device 150 can be positioned on an HBA. Lead frame portion 117 can facilitate electrical communication between circuitry on a substrate (or other components to which modular optical device 150 is mounted) and dual stage fabricated package 104. Accordingly, lead frame portion 117 enables data transmission and/or data reception, as well as the transmission and reception of control and monitoring signals, between dual stage fabricated package 104 and the substrate (or other appropriate components). Electrical communication can include communication between a light source included in fabricated package 116, such as, for example, a laser and a corresponding laser driver circuit on the substrate. Likewise, electrical communication can include communication between a light detector included in fabricated package 116, such as, for example, a photodiode, and a corresponding transimpedance amplifier circuit on the substrate. Lead frame portion 117 can be connected to the substrate in a variety of ways, including, but not limited to, surface mount connectors, thru hole connectors, and compression-type connectors.

A connected substrate can include an edge connector suitable for connecting the substrate to a corresponding receptacle in a computer system, for example, to establish a mechanical and electrical interface between the substrate and computer system bus. Alternately, the edge connector can facilitate establishment of a mechanical and electrical interface between modular optical device 150 and a variety of other devices, such as, for example, an optical router or optical hub.

Components (not shown), such as, for example, light emitting diodes, a laser driver, a post amplifier, a transimpedance amplifier, a current bias driver, volatile and/or non-volatile memory, and a thermo-electric cooler ("TEC") can be implemented on a substrate. Components can be implemented on either side of the substrate as appropriate. Implemented components can interface electrically with modular optical device 150 through lead frame portion 117. Likewise, when the substrate is coupled to a computer system or other device, such implemented components can interface electrically with the computer system or other device. Mounting components, circuits and devices on both sides of the substrate can facilitate a compact structure without any meaningful loss in functionality. Moreover, as previously described, this aids space conservation on an HBA or other device to which the modular optical device 150 is mounted.

Modular optical device 150 can be arranged on a substrate such that distance between lens pins 108 and 106 is sufficiently large such that a first optical connector can be connected to lens pin 106, while a second optical connector is simultaneously connected to lens pin 108 and vice versa. Generally, lens pins 106 and 108 can be configured to receive any of a variety of connectors, such as, for example, SC, LC, ST, and FC connectors. Other configurations of modular optical devices can be configured as appropriate to simultaneously connect to a corresponding number of optical connectors.

Generally, a HBA can be any type of printed circuit board implemented as a suitable connector interface for use with a computer system, wherein the connector interface may take the form of, for example, a peripheral component interconnect ("PCI") card having edge connectors configured and arranged to interface with a desktop computer system. The connector interface may alternatively take the form of, for example, a printed circuit board with a serial or parallel port, or a Personal Computer Memory Card International Association ("PCMCIA") standard card. Note that as used herein, "connector interface" generally refers to a PCB or other device that acts as an interface between an optical component, such as the modular optical device 150, and a host system such as a laptop computer, desktop computer, or portable computing systems such as personal digital assistants ("PDAs"). One example of a PCB is a transceiver PC board.

Figure 3A:
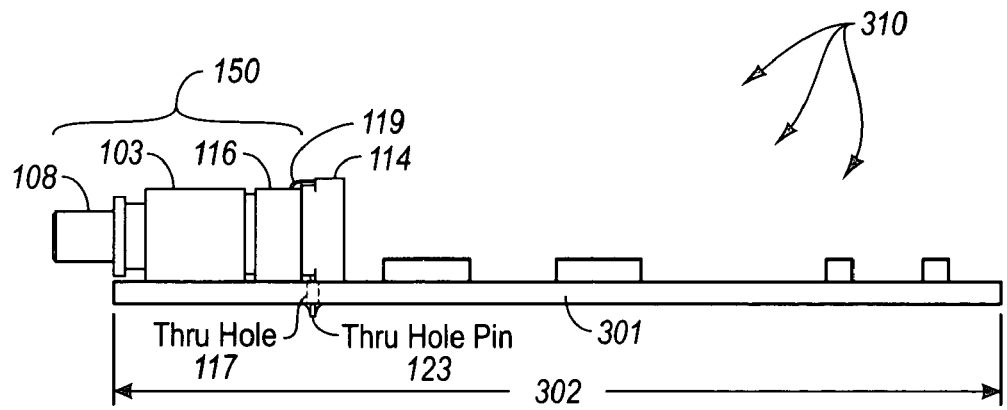
FIG. 3A illustrates an example side view of an assembled modular optical device package including a fully formed dual stage fabricated package coupled to a substrate.

Referring now to FIG. 3A, FIG. 3A illustrates an example side view of an assembled dual stage modular optical device 150 with a thru hole pin configuration 117 positioned on host bus adapter 310. Modular optical device 150 includes components fabricated package 114, fabricated package 116, lead frame portion 119, lens block 103, lens pin 108, and lens pin 106 (which from the side view perspective in FIG. 3A is behind lens pin 108 and thus is not visible). Further, modular optical device 150 includes a thru hole pin configured lead frame, which can be an array of electrical pins suitable for connecting to substrate 301.

As depicted in FIG. 3A, a lead frame having a thru hole pin configuration facilitates electrical communication between circuitry (not shown) on substrate 301 (or other components to which modular optical device 150 is mounted) and fabricated package 114. To secure modular optical device 150 to substrate 301, pins of the thru hole pin configured lead frame (e.g., pin 123 and other pins) can be inserted through thru holes (e.g., thru hole 117 and other thru holes) in substrate 301. Subsequently, thru hole pins can be mechanically and electrically coupled to substrate 301. Accordingly, a thru hole pin configured lead frame enables data transmission and/or reception, as well as the transmission and reception of control and monitoring signals, between fabricated package 114 and substrate 301 (or other appropriate components).

Electrical communication can include communication between a light source included in fabricated package 116, such as, for example, a laser and a corresponding laser driver circuit on substrate 301. Likewise, electrical communication can include communication between a light detector included in fabricated package 116, such as, for example, a photodiode, and a corresponding transimpedance amplifier circuit on substrate 301. As depicted in FIG. 3A, substrate 301 has length 302.

Figure 3B:
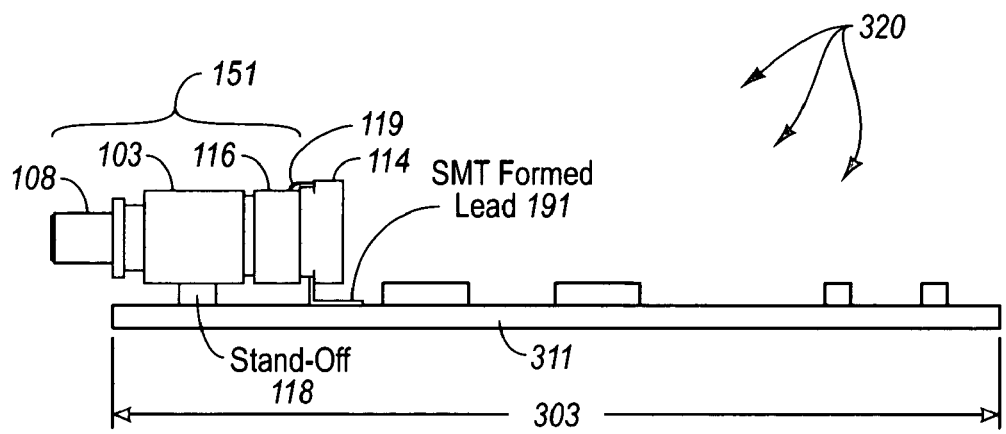
FIG. 3B illustrates an example side view of an alternate configuration of an assembled modular optical device package including a fully formed dual stage fabricated package coupled to a substrate.

FIG. 3B illustrates an example side view of an alternate configuration of dual stage modular optical device 151 positioned on HBA 320 that facilitates electrical communication between circuitry on substrate 311 (or other components to which modular optical device 151 is mounted) and fabricated package 114. In the embodiment of FIG. 3B, stand-off 118 is used to mechanically secure optical device 151 to substrate 311. SMT (Surface Mount Technology) formed lead frame 191 electrically connects components of fabricated package 114 to components of substrate 311. As depicted in FIG. 3B, substrate 311 has length 303 similar to length 302.

Figure 3C:
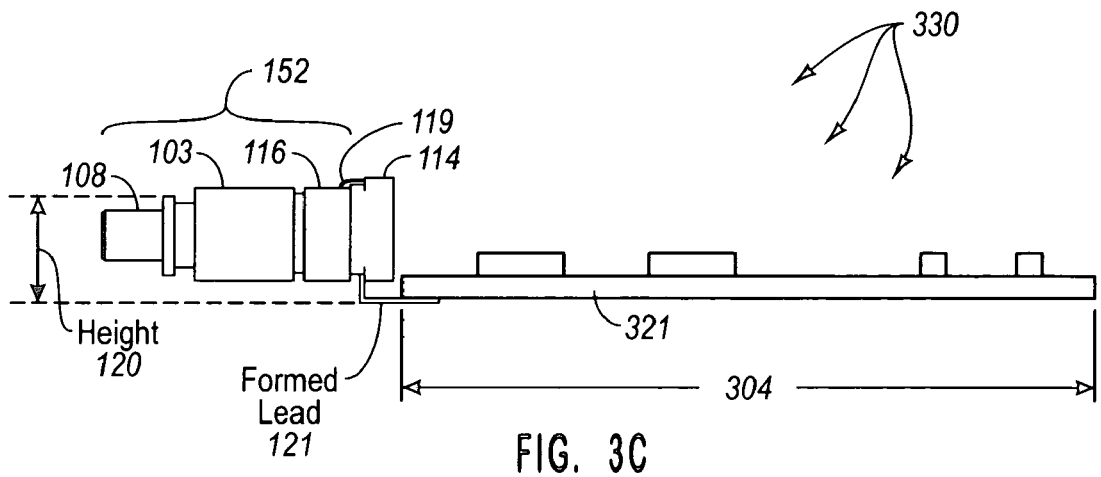
FIG. 3C illustrates an example side view of another alternate configuration of as assembled modular optical device package including a fully formed dual stage fabricated package coupled to a substrate.

FIG. 3C illustrates an example side view of another alternate configuration of modular optical device 152 positioned on HBA 330 that facilitates electrical communication between circuitry on a substrate 321 (or other components to which modular optical device 152 is mounted) and fabricated package 114. Formed lead frame 121 mechanically and electrically couples optical device 152 to substrate 321. The configuration of formed lead frame 121 along with the mounting point being on the underside of substrate 321, results in height 120 being reduced as compared to other configurations (e.g., those in FIGS. 3A and 3B). Further as depicted in FIG. 3C, length 304 is substantially reduced compared to lengths 302 and 303.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A modular optical device, comprising:
    a first fabricated package including an optoelectronic component;
    a second fabricated package defining an opening that permits insertion of circuitry therethrough, the circuitry being configured to electrically interoperate with the optoelectronic component; and
    a lead frame that extends from a first end of the opening to a second end of the opening, that mechanically connects the first fabricated package to the second fabricated package, and that electrically connects the optoelectronic component to contacts exposed in the opening, wherein:
        in a first configuration of the modular optical device, the first fabricated package is spaced apart from the second fabricated package by a portion of the lead frame that mechanically connects the packages;
        in a second configuration of the modular optical device, the mechanically connecting portion of the lead frame is bent to position one of the first and second fabricated packages on top of the other; and
        in the second configuration of the modular optical device, the mechanically connecting portion of the lead frame is bent no more than twice to position the first and second fabricated packages on top of one another.

2. The modular optical device as recited in claim 1, wherein the optoelectronic device comprises at least one of a light source for generating optical signals and a light detector for detecting optical signals.

3. The modular optical device as recited in claim 1, further comprising: one or more external connectors mechanically coupled to the second fabricated package, the one or more external connectors facilitating mechanical and/or electrical connections to external components.

4. The modular optical device as recited in claim 1, further comprising a lens block mechanically coupled to the first fabricated package, the lens block configured such that one or more lens pins can mechanically couple to the lens block.

5. The modular optical device as recited in claim 4, further comprising: a lens pin mechanically coupled to the lens block, the lens pin for directing an optical signal between the optoelectronic device and a corresponding external component.

6. The modular optical device as recited in claim 1, wherein the optoelectronic device comprises a vertical cavity surface emitting laser.

7. The modular optical device as recited in claim 1, wherein the optoelectronic device comprises a photodiode.

8. The modular optical device recited in claim 1, wherein the second fabricated package encases portions of the lead frame that circumscribe the opening while leaving portions of the lead frame within the opening unencased to facilitate the insertion of circuitry.

9. An optoelectronic interface device comprising:
a host bus adapter having a printed circuit board with at least one connector for electrically interfacing with a host device; and
a modular optical device configured to mechanically and electrically interface with the host bus adapter, the modular optical device comprising:
a first fabricated package including at least one of a light source and a light detector;
a second fabricated package defining an opening that permits insertion of circuitry therethrough, the circuitry being configured to electrically interoperate with the at least one of a light source and light detector;
a lead frame including a first portion that mechanically connects the first fabricated package to the second fabricated package and that electrically connects the at least one of a light source and light detector to lead frame contacts exposed in the opening of the second fabricated package, the lead frame further including a second portion that provides a mechanical and/or electrical connection from the modular optical device to a host bus adapter external to the modular optical device;
a lens block mechanically coupled to the first fabricated package the lens block configured to receive one or more lens pins;
at least one lens pin mechanically coupled to the lens block, the at least one lens pin for transferring an optical signal between the at least one of a light source and a light detector and an external component, wherein:
in a first configuration of the modular optical device, the first fabricated package is spaced apart from the second fabricated package by a portion of the lead frame that mechanically connects the packages;
in a second configuration of the modular optical device, the mechanically connecting portion of the lead frame is bent to position one of the first and second fabricated packages on top of the other; and
in the second configuration of the modular optical device, the mechanically connecting portion of the lead frame is bent no more than twice to position the first and second fabricated packages on top of one another.

10. The optoelectronic interface device as recited in claim 9, wherein the host bus adapter includes components for converting between an optical signal and an electrical signal.

11. The optoelectronic interface device as recited in claim 10, wherein the host bus adapter includes at least one of a laser driver and a transimpedance amplifier.

12. The optoelectronic interface device as recited in claim 9, wherein the optoelectronic interface device is configured to be substantially received within a standard slot of the host device.

13. The optoelectronic interface device as recited in claim 12, wherein the standard slot comprises one of: a PCI card slot and a PCMCIA card slot.

14. The optoelectronic interface device as recited in claim 9, wherein the host bus adapter comprises a printed circuit board for one of: a peripheral component interconnect card and a PCMCIA card.

15. A modular optical device comprising:
a first fabricated package including a laser and a photodiode;
a second fabricated package defining an opening that permits insertion of circuitry therethrough, the circuitry being configured to electrically interoperate with the laser and the photodiode and the second fabricated package including a connector for electrically and mechanically coupling the second fabricated package to a substrate; and
a lead frame that extends from a first end of the opening to a second end of the opening, that mechanically connects the first fabricated package to the second fabricated package, and that electrically connects the laser and the photo diode to contacts exposed in the opening, wherein:
in a first configuration of the modular optical device, the first fabricated package is spaced apart from the second fabricated package b a portion of the lead frame that mechanically connects the packages;
in a second configuration of the modular optical device, the mechanically connecting portion of the lead frame is bent to position one of the first and second fabricated packages on top of the other; and
in the second configuration of the modular optical device, the mechanically connecting portion of the lead frame is bent no more than twice to position the first and second fabricated packages on top of one another.

16. The modular optical device recited in claim 15, wherein the first fabricated package includes an optoelectronic device electrically connected with the lead frame.

17. The modular optical device recited in claim 15, wherein the lead frame extends through an outer wall of the second fabricated package.

* * * * *